US009015196B2

(12) United States Patent
Esposito et al.

(10) Patent No.: US 9,015,196 B2
(45) Date of Patent: Apr. 21, 2015

(54) INTERNAL SOCIAL NETWORK FOR AN ENTERPRISE AND APPLICATIONS THEREOF

(75) Inventors: Deni Esposito, Richmond Hill (CA); Linh Hua, Mississauga (CA); Rodri O. Walker, Toronto (CA); Chin Hsu, North York (CA); Paul Martin Ives, Toronto (CA)

(73) Assignee: DST Technologies, Inc., Kansas City, MO (US)

( * ) Notice: Subject to any disclaimer, the term of this patent is extended or adjusted under 35 U.S.C. 154(b) by 211 days.

(21) Appl. No.: 13/468,334

(22) Filed: May 10, 2012

(65) Prior Publication Data

US 2013/0304763 A1    Nov. 14, 2013

(51) Int. Cl.
*G06F 17/30* (2006.01)
*G06F 7/00* (2006.01)

(52) U.S. Cl.
CPC ..................... *G06F 17/30* (2013.01)

(58) Field of Classification Search
CPC   G06F 21/00;  G06F 21/604;  G06F 2221/2141
USPC ................................. 707/781, 783
See application file for complete search history.

(56) References Cited

U.S. PATENT DOCUMENTS

| | | | | |
|---|---|---|---|---|
| 5,017,917 | A * | 5/1991 | Fisher et al. ................ | 340/14.1 |
| 5,968,177 | A * | 10/1999 | Batten-Carew et al. ......... | 726/4 |
| 7,478,421 | B2 * | 1/2009 | Kodimer et al. .................. | 726/4 |
| 7,669,244 | B2 * | 2/2010 | Smith ............................ | 726/26 |
| 2006/0259367 | A1 * | 11/2006 | Sattler et al. .................... | 705/26 |
| 2006/0259957 | A1 * | 11/2006 | Tam et al. ......................... | 726/3 |
| 2011/0191485 | A1 * | 8/2011 | Umbehocker ............... | 709/229 |
| 2012/0005224 | A1 * | 1/2012 | Ahrens et al. ................ | 707/769 |
| 2012/0271855 | A1 * | 10/2012 | Faitelson et al. ............. | 707/785 |

OTHER PUBLICATIONS

Facebook, "Sharing and Finding You on Facebook", Data Use Policy, http://www.facebook.com/about/privacy/your-tnfo-on-fb#conrrolprofile, accessed Dec. 19, 2011, 2 pages.
IBM, "IBM Connections", Features and Benefits, 4 pages, http://www-01.ibm.com/software/lotus/products/connections/features.html, accessed Dec. 5, 2011.
Wikipedia, "Social Networking Service", 13 pages, https://web.archive.org/web/20111227020210/https://en.wikipedia.org/wiki/Social_network_service, accessed Dec. 16, 2011.
Yammer, "The Enterprise Social Network", 2 pages, https://www.yammer.com/about/product, accessed Dec. 5, 2011.

* cited by examiner

*Primary Examiner* — Pavan Mamillapalli
(74) *Attorney, Agent, or Firm* — Lempia Summerfield Katz LLC (57) ABSTRACT

A social networking system for deployment within an enterprise and a method for sharing data among a plurality of users of the enterprise-deployed social networking system are provided. The social networking system provides a database including a plurality of data records. Each data record of the plurality of data records includes data relating to one user of the plurality of users. A permission matrix defining, for each user of the plurality of users, first permissions and second permission is also provided. Upon receipt of a request for a first data record of the plurality of data records, a source of the request is identified, and a portion of the first data record accessible to the identified source of the request is determined using the permission matrix. The portion of the first data record is transmitted to the identified source based on the determination.

17 Claims, 7 Drawing Sheets

Calendar

Awards

LMS
- AWD Basics
- 2009 Anti Money Laundering
- AWD 2010 Anti Money Laundering
- Mutual Fund Processing Introduction Other

408

Quality Statistics

Quality
| | | | | | |
|---|---|---|---|---|---|
| NASU | 86% | PAC | 99% | MAINT | 77% |
| SWP | 98% | HMAINT | 87% | ADDR | 100% |
| TRANS | 40% | REDEEM | 99% | PRUCH | 100% |

*Last Fail* – September 1, 2011, TRANS, incorrect amount total. 5th occurrence in 12 years.

*QC Comments* – Sample Text

INTERNAL SOCIAL NETWORK FOR AN ENTERPRISE AND APPLICATIONS THEREOF

BACKGROUND

A social networking service is an online service that focuses on building social networks and/or relationships among people who share interests. A user of a social network service may be able to create a profile that lists, for example, information about the user as well as social links (e.g., friends of the user). For example, the user may post ideas, activities, events, interests, and contact information on their user profile. The user may be able to upload pictures to their profile, post blog entries, search for other users, and/or store a list of contacts.

The social networking service may also facilitate communication between users over the Internet through e-mail and/or instant messaging, for example. The user profile may include a section for other users to leave comments and upload other content. The social networking service may include forums, where the user may communicate with other users. The user may be able to create and/or subscribe to groups that share common interests or affiliations, and the user may be able to send or receive comments and other content to or from the other group members. The social networking service may provide controls that allow the user to determine which other users may view the user profile or contact the user, and to which users profile changes or updates are reported or pushed.

Facebook is an example of a widely used social networking service. A Facebook user creates a profile for other users to view. The user may add other users as friends, and these friends may be automatically notified when the user updates his or her profile. For example, the friends of the user may be notified when, for example, the user uploads new pictures or changes his or her status to "at work." The Facebook user may set one or more parts of the profile to "public" (e.g., all Facebook user may view the one or more parts of the profile), and may set parts of the profile to "private" (e.g., only friends may view the one or more parts of the profile).

Twitter is another example of a widely used social networking service. A Twitter user may send and receive text-based posts of up to 140 characters, known as "tweets." The user may subscribe to other users' tweets, and other users may subscribe to the user's tweets (e.g., followers). Tweets are public by default, but the user may restrict messages to be private such that only followers of the user may see the tweet. Due to the content limit (e.g., up to 140 characters), tweets may direct followers to content-hosting services such as, for example, Twitpic to accommodate multimedia content and text longer than 140 characters.

Generally, social networks, as described above, have been marketed towards individual users and deployed so as to be publicly available to the general population of Internet users for their private use. Accordingly, the implementations of these social networks have had to account for privacy concerns, data ownership concerns, etc. and are subject to both public and regulatory scrutiny.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

The disclosed embodiments relate to a social networking system for deployment within an enterprise and a method for sharing data among a set of users of the enterprise-deployed social networking system. The disclosed system, in order to increase the efficiency of a worker at an enterprise, may provide a database including a plurality of data records. Each data record of the plurality of data records includes data relating to one user of the plurality of users. A permission matrix defining, for each user of the set of users, first permissions and second permission is also provided. Upon receipt of a request for a first data record of the plurality of data records, a source of the request is identified, and a portion of the first data record accessible to the identified source of the request is determined using the permission matrix. The portion of the first data record is transmitted to the identified source based on the determination.

In an enterprise deployment, the needs of the enterprise and the nature of the deployment environment necessitate a social network structure which may not be applicable in a public deployment and which, if implemented in a public setting, would garner both public and regulatory scrutiny. In particular, in an enterprise deployment, an employee's right of privacy, as it relates to the business or facilities of the enterprise, may be limited as compared to their rights in the public setting. Furthermore, information relating to an employee, which may form a part of a profile thereof, may come from many sources, to which the employee, for liability, security or other reasons, may not be privy. Furthermore some employee information, which may form a part of a profile of the employee, may be confidential or otherwise of a sensitive nature requiring controlled access thereto by someone other than the employee himself or herself. As such, an enterprise deployment of a social networking system offers both increased flexibility free from the regulatory and public scrutiny that plagues publicly deployed systems, as well as increased complexity due to confidentiality and liability concerns of a private organization, which may be born from regulatory and public policy concerns of a different character.

For example, a first worker may start working at an enterprise as a Call Center Associate. When the first worker starts at the enterprise, a second worker who works in, for example, the human resources department of the enterprise and/or the first worker may create a profile (e.g., a first data record) for the first worker within an enterprise social networking system. The profile for the first worker may include contact information and bibliographical information such as, for example, the phone number and email address assigned to the first worker, the location (e.g., a building and office number) where the first worker works, a picture of the first worker, the position, in which the first worker works, and/or other information, such as demographic information. The demographic information may include, for example, gender, race, marital status, payroll information (e.g., direct deposit information), employee status (e.g., exempt vs. non-exempt), payment structure (e.g., salaried vs. hourly, time card information), payroll exemptions, health insurance and/or other benefit information, 401k participation, other deductions, legal garnishments, vacation days and/or sick days (allowed, consumed, paid/unpaid), or a combination thereof.

After the first worker starts work at the enterprise, the first worker, the second worker, and/or other workers at the enterprise may update the profile for the first worker (e.g., add information to and/or remove information from the profile of the first worker) based, at least in part, on permissions defined by the first worker. The first worker, for example, may update the profile by adding work-related information such as, for example, descriptions of projects the first worker worked on in the past, is currently working on, and/or is planning on working on in the future, availability, a project timeline, and/or media files (e.g., text documents, images, and/or videos) relevant to the first worker's area of business. The second worker (e.g., working in the human resources department of the enterprise), for example, may update the profile by adding compensation-related information such as, for example, the first worker's salary and/or the first worker's bonus structure. Other workers (e.g., a third worker who is a boss of the first worker) at the enterprise using the enterprise social networking system may, for example, update the profile by adding performance-related information such as, for example, a performance review for a year of employment. The first worker, the second worker, and the other workers may update the profile with other information. The first worker, the second worker, and/or the other workers may add personal information, may add information about skills the first worker possesses or the kind of work the first worker would like to perform, for example.

Different groups of workers at the enterprise using the enterprise social networking system may be able to view different parts of the profile based, at least in part, on permissions defined by the first worker. All workers at the enterprise using the social networking system, for example, may be able to view the contact information/bibliographic information portion of the profile for the first worker. However, some of the workers may not be able to view the work-related portion, the compensation-related portion, and/or the performance-related portion of the profile.

The different groups of workers at the enterprise may be at least partly defined by different work-related and/or social groups at the enterprise. For example, different workers at the enterprise may have different access to the profile of the first worker. Peers of the first worker, managers of the first worker (e.g., junior and senior managers), and workers that have access to sensitive information such as, for example, personal information (e.g., a social security number for the first worker) and/or company secret information (e.g., a company trade secret) may have different access (e.g., to view and/or update) to the profile of the first worker. The different groups may overlap. For example, the manager may have full access to the profile of the first worker because of the manager's roles as both the manager of the first worker and a worker having access to sensitive information at the enterprise.

It will be appreciated that deployment of social networking functionality in a private context, such as in a workplace, as was described above, may not be subject to the same degree of public or regulatory scrutiny levied against public deployments, as, generally, it is recognized that employees have limited privacy rights when utilizing employer-provided technology. The first worker may not be able to control all of the permissions to access the profile for the first worker. The second worker, the third worker, or another worker may be able to access all of the profile for the first worker and/or control all of the permissions for the profile for the first worker, regardless of the permissions the first worker sets or attempts to set. For example, the manager or a worker in the information technology department of the enterprise may be able to access all of the profile for the first worker regardless of the permissions the first worker sets. Accordingly, the first worker may not be able to access all of his or her own profile. For example, the first worker may not be able to access the compensation-related portion and/or the performance-related portion of the profile.

The functionality described above may be utilized in the workplace to streamline business processes and promote collaboration between employees of the enterprise. An employee of the enterprise may be able to create the profile that lists, for example, work-related information about the employee and links to other employees within the enterprise and/or business contacts outside of the enterprise.

The work-related information may include, for example, the address of the building the employee works in, contact information (e.g., an email address and a phone number) for the employee, the title of the position, in which the employee works, and biographical information such as, for example, skills, certifications, awards, work history, references, and recommendations. The employee may also be able to post messages regarding, for example, ideas, projects, events, and/or job openings that followers of the employee will receive. The employee may follow and will thus receive messages posted by other employees. The employee may join groups relating to, for example, the geographical location and/or the department, in which the employee works. The employee will receive messages posted by other employees within the groups. This type of functionality helps employees share and organize information, thus increasing efficiency of the employees.

Figure 1:
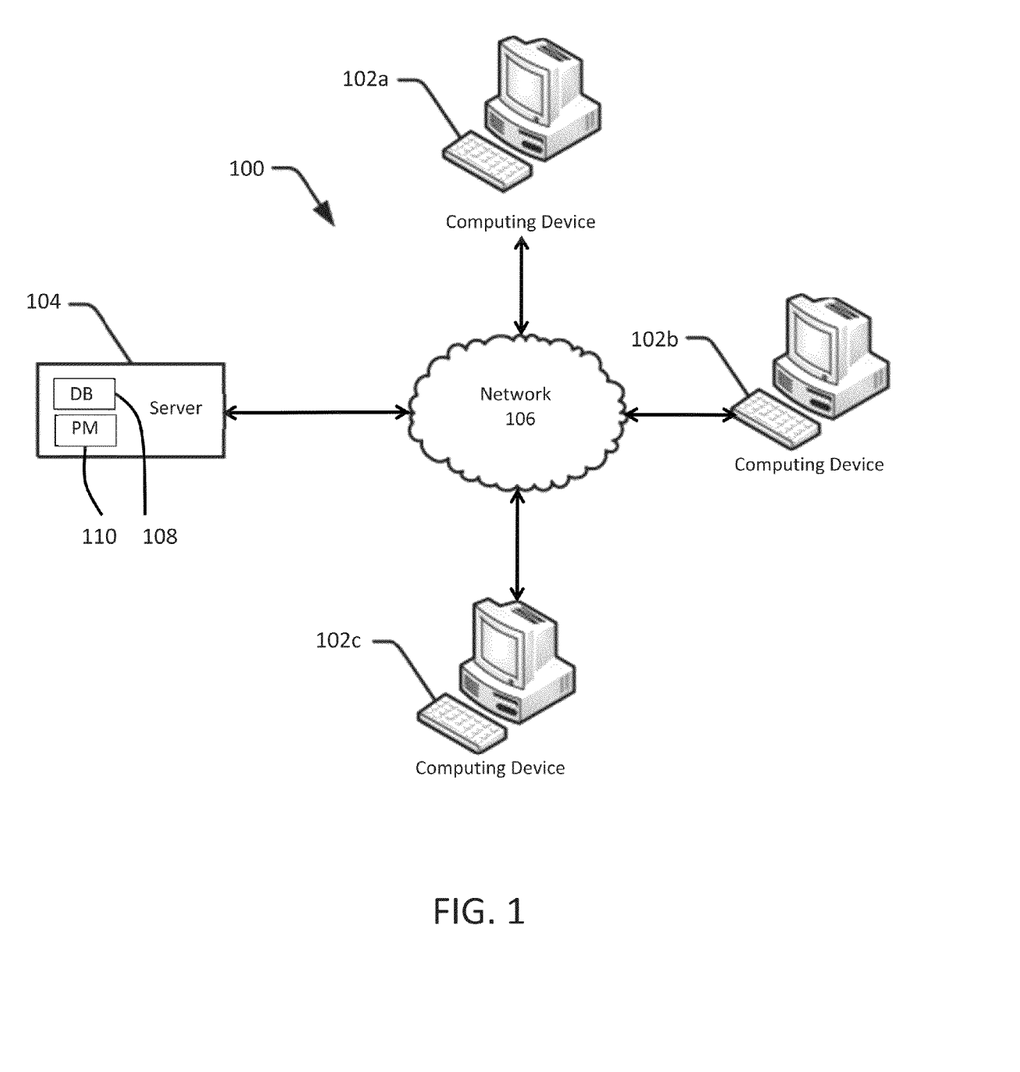
FIG. 1 shows one embodiment of a system for sharing data among a plurality of users of an enterprise resource management architecture.

FIG. 1 shows one embodiment of a system 100 for sharing data among a set of users (e.g., a plurality of users) of an enterprise resource management architecture. The set of users includes a plurality of subsets. The system 100 includes a plurality of computing devices 102 (e.g., a first computing device 102a, a second computing device 102b, and a third computing device 102c) in communication with a server 104 via a network 106. The server 104 includes a database 108 and a permission matrix 110. Users (e.g., workers at an enterprise) may use the plurality of computing devices 102 to be assigned work, work on work-related tasks, and/or communicate with other workers at the enterprise. For example, a first worker may use the first computing device 102a, a second worker may use the second computing device 102b, and a third worker may use the third computing device 102c. More than one worker may use the first computing device 102a, the second computing device 102b, and/or the third computing device 102c. For example, the first worker, the second worker, and the third worker may share the first computing device 102a. The system 100 may include more or fewer computing devices 102. Each computing device of the plurality of computing devices 102 and the server 104 may be located in the same or different rooms, the same or different facilities, or the same or different enterprise campus. In one embodiment, the plurality of computing devices 102 may be operated by a first enterprise, and the server 104 may be operated by a second enterprise. In other words, the plurality of computing devices 102 may be operated in a first geographic location, and the server 104 may be operated in a second geographic location, the second geographic location being remote from the first geographic location. The database 108 and/or the permission matrix 110 may be included within the server 104 or may be separate from the server 108. The system 100 may include more databases 108 and/or permission matrices 110 within the server 104 or separate from the server 104.

The database 108 includes a plurality of data records. Each data record of the plurality of data records includes a data set (e.g., data) relating to one of the users (e.g., a first worker). The data record (e.g., a first data record) may, for example, be a "profile" for the first worker that may be at least partially accessible to other workers at the enterprise. The data may be generated by the first worker at the first computing device 102a, for example. Alternatively or additionally, the data may be generated by one or more other workers (e.g., a second worker) at one or more computing devices of the plurality of computing device 102 and/or may be automatically generated. The first worker, the one or more other workers, the system 100, or a combination thereof may save the data to the database 108. In one embodiment, at least one data record of the plurality of data records includes data relating to a group of users of the plurality of users. For example, the group may be associated with a division (e.g., finance) within the enterprise, a common interest, professional or social, shared by the users of the group, or any other interest shared by the users of the group. The at least one data record may be generated by users within the group, users of the plurality of users outside of the group, or a combination thereof. One or more users of the group may be a group administrator able to control membership and/or group configuration.

In one embodiment, when the first worker starts working at the enterprise, one or more other workers (e.g., the second worker), for example, generate a first portion of the data. The first portion of the data may include data for the address of the building the first worker works in, the contact information for the first worker, the title of the position, in which the first worker works, and other bibliographical information. In other words, the second worker may set up a "profile" for the first worker when the first worker starts working at the enterprise. The second worker may, for example, work in human resources at the enterprise. In one embodiment, the first worker generates the first portion of the data when the first worker starts working at the enterprise. In another embodiment, the first worker and the one or more other workers (e.g., the second worker) generate different part of the first portion of the data when the first worker starts working at the enterprise.

The first worker may generate a second portion of the data while working at the enterprise. The second portion of the data may include, for example, data for a project timeline corresponding to the first worker, data for messages regarding, for example, ideas, projects, events, and/or job openings, documents such as memos and presentations, media files, or a combination thereof. The data for the project timeline may include, for example, a timeline of past work-related projects completed by the first worker, work-related projects currently being worked on by the first worker, work-related projects to be worked on in the future, or a combination thereof. The data for the project timeline may include descriptions of the past work-related projects, the current work-related projects, and/or the future work-related projects. The descriptions may identify errors or problems encountered when working through the past and current work-related projects, so that other workers in the enterprise do not repeat the same errors. The descriptions may help other workers in the enterprise identify expertise and/or familiarity with a particular subject matter relevant to another project. The first worker may generate any other data as part of the data record.

One or more components of the system 100 (e.g., the server 104) may automatically generate a third portion of the data. The third portion of the data may include, for example, data for current location information, data for calendar events for the first worker, and/or performance data (e.g., for accuracy and/or productivity) for the first worker. For example, the data for current location information may be generated by the server 104 based on a most recent IP address, at which the first worker most recently logged in, or a location of a tracked mobile device. The data for calendar events may be synched with a calendar software program on the first computing device 102 or another computing device. Using the synched data for calendar events may be advantageous, for example, in that other workers at the enterprise may know when the first worker is available.

In one embodiment, the server 104 may track performance statistics (e.g., a number of errors in performing a work-related task) for the first worker. The server 104 may generate statistics for accuracy and/or productivity based on the tracked performance statistics.

The second worker or other users of the system 100 (e.g., other workers) may generate a fourth portion of the data while the first worker is working at the enterprise. The fourth portion of the data may be associated with the first worker (e.g., directed to the first worker or about the first worker). The fourth portion of the data may include, for example, data for awards issued to the first worker (e.g., by a manager of the first worker), data for an annual review, current and/or historical data for wage and bonus information, or a combination thereof. The second worker or the other workers may generate any other data.

The data sets relating to each user (e.g., the one user, the first worker) of the plurality of users includes a plurality of data subsets. Each of the data subsets is accessible to at least one of the subsets of users. At least some data subsets of the plurality of data subsets are accessible to different subsets of the users. In one embodiment, each subset of the plurality of subsets is accessible to a different subset of the users. Each data subset of the plurality of data subsets may include at least some of the first portion of the data (e.g., generated by the second worker), at least some of the second portion of the data (e.g., generated by the first worker), at least some of the third portion of the data (e.g., automatically generated by one or more components of the system 100), at least some of the fourth portion of the data (e.g., generated by the second worker or any other worker), or a combination thereof. "Accessible" may be that a user (e.g., the second worker) requests and receives (e.g., in the pull direction) a subset of the data relating to the one user (e.g., the first worker) from the server 104, or the server 104 sends (e.g., in the push direction) a subset of the data relating to the one user to the second worker, for example, without a specific request for the subset of the data relating to the one user. A subset may or may not be overlapping with other subsets, and the subset may include all or less than all of the entire set (e.g., the data relating to the plurality of users).

The permission matrix 110 may be a multidimensional permission matrix. The permission matrix 110 may define first permissions and second permissions for each user or at least one user of the plurality of users. In one embodiment, the permission matrix 110 may define third permission for each user or at least one user of the plurality of users. Each user of the plurality of users may control (e.g., set) the first permissions, the second permissions, and/or the third permissions using a computing device of the plurality of computing devices 102. For example, throughout employment at the enterprise, the first worker may set, using the first computing device 102a, for example, different of the first permissions, the second permissions, and/or the third permissions relating to different uses of the plurality of users. The first permissions define which parts of the data are accessible to view (e.g., in the pull direction and the push direction) for which users of the plurality of users. In other words, the first permissions define, for each of the subsets of users, a corresponding data subset of the data subsets, to which the subset of users has access to view. For example, the first permissions may define the first portion of the data generated by the second worker when the first worker starts at the enterprise to be accessible by all users of the plurality of users of the enterprise resource management architecture. The first permissions may also define the second portion of the data generated by the first worker to be accessible by a first subset of users of the plurality of users. In other words, all users of the plurality of users may access, for example, the data for the address of the building the first worker works in, the contact information for the first worker, the title of the position, in which the first worker works, and other bibliographical information, while only the first subset of users may access, for example, the data for the project timeline.

The second permissions define which users of the plurality of users have permission to update (e.g., add or remove) which parts of the data. In other words, the second permissions define, for each of the subsets of users, a corresponding data subset of the data subsets, to which the subset of users has access to update. For example, the second permissions may define the first portion of the data, which is generated by the second worker when the first worker starts at the enterprise, to be updatable only by the first worker and the second worker. In other embodiments, the second permissions may also define the first portion of the data to be updatable by other users (e.g., workers) of the plurality of users (e.g., by the boss of the second worker). As another example, the second permissions may define the fourth portion of the data, which is generated by the second worker or other workers while the first worker is working at the enterprise, to be updatable only by the second worker or the other workers.

The third permissions define, for each user or some users of the plurality of users, which parts of the data the user (e.g., the first worker) is to receive in the push direction. In other words, the third permissions define, for at least one user of the set of users, a corresponding data subset of the data subsets, to which the at least one user is to receive without requesting the corresponding data subset. For example, the third permissions may define that the first worker is to receive at least some of the second portion of the data related to the second worker when the second worker updates the corresponding second portion of the data. In other words, when the second worker updates a project timeline corresponding to the second worker or generates a message regarding, for example, a project the second worker is currently working on, receives at least a part of the project timeline and/or the generated message regarding the project in the push direction.

The first worker has control of less than all of the first permissions, the second permissions, and/or the third permissions. For example, the data relating to the first worker may include data about the first worker and generated by the first worker (e.g., the second portion of the data), and data about the first worker and generated by the second worker or other workers (e.g., the first portion of the data and the fourth portion of the data). In one embodiment, the first worker may be able to control (e.g., set) all of the first permissions for the second portion of the data, but may not be able to control (e.g., set) all of the first permissions for the first portion of the data, the third portion of the data, and/or the fourth portion of the data. In other words, if the first worker generates the data, the first worker may determine who is able to access the data generated by the first worker. In one embodiment, the first worker may be able to control less than all of the first permissions. For example, the second worker or a third worker (e.g., a worker working in the information technology (IT) department of the enterprise or the CEO of the enterprise) may be able to access all or some of the second portion of the data regardless of the first permissions set by the first worker. In other embodiments, the first worker may be able to control all of the first permissions for the first portion of the data, the second portion of the data, the third portion of the data, and/or the fourth portion of the data. Alternatively, the first worker may be able to control less than all of the first permissions for the first portion of the data, the second portion of the data, the third portion of the data, and the fourth portion of the data.

In one embodiment, the first worker may be able to control (e.g., set) all of the second permissions for the second portion of the data, but may not be able to control (e.g., set) all of the second permissions for the first portion of the data and/or the fourth portion of the data. In other words, if the first worker generates the data, the first worker may determine who is able to update the data generated by the first worker. In one embodiment, the first worker may be able to control less than all of the second permissions. For example, the second worker or the third worker may be able to update all or some of the first portion of the data and/or the fourth portion of the data regardless of the second permissions set by the first worker. In other embodiments, the first worker may be able to control all of the second permissions for the first portion of the data, the second portion of the data, the third portion of the data, and/or the fourth portion of the data. Alternatively, the first worker may be able to control less than all of the second permissions for the first portion of the data, the second portion of the data, the third portion of the data, and the fourth portion of the data.

In one embodiment, the first worker may be able to control (e.g., set) all of the third permissions. In other words, the first worker may be able to determine which data from which users of the plurality of users the first worker wants to automatically receive in the push direction. Alternatively, the first worker may control less than all of the third permissions. For example, emergency messages from the third worker (e.g., part of the data generated by the third worker) may be automatically pushed to the first worker regardless of the third permissions set by the first worker. Other data from other users of the plurality of users may be pushed to the first worker regardless of the third permissions set by the first worker.

Each user of the plurality of users may be defined by a role within the enterprise. The role may be defined by the position and/or the department, in which the user works. For example, the role may be "Design Engineer," "IT Technician," "CEO," or "Human Resources." The role may also be defined by other attributes of the user. Some users of the plurality of users may be defined by more than one role within the enterprise. The subsets of users may be defined, at least partially, by the roles of the users within the subsets. For example, one of the subsets of users may include all of the workers that work within the human resources department of the enterprise. Users may be included within more than one of the subsets of users.

The one or more roles for the first worker, for example, may be defined by the second worker and stored at the server 104 or another computing device. In one embodiment, the first permissions and/or the second permissions of the permission matrix 110 may be at least partially defined by the roles of the plurality of users. In other words, a user (e.g., the second worker) of the plurality of users may have access to data (e.g., the first portion of the data, the second portion of the data, the third portion of the data, the fourth portion of the data, or a combination thereof) relating to another user (e.g., the first worker) of the plurality of users based on the position or department the user works in at the enterprise. For example, at least some users of the plurality of users having the role of "Human Resources" (e.g., the second worker) may have access to all of the first portion and the second portion of the data for all users of the plurality of users, as defined by the first permissions. These users having the role of "Human Resources" may have access to all of the first portion and the second portion of the data for all the users regardless of the first permissions and the second permissions set by the users (e.g., the first worker). The server 104 may automatically set at least some of the first permissions and/or the second permissions based on the roles of the plurality of users.

In one embodiment, at least some of the first permissions, at least some of the second permissions, and/or at least some of the third permissions for the data records relating to groups of users may be automatically determined and/or set based on membership within the groups. In another embodiment, one or more users (e.g., the group administrator) of the group may determine and/or set at least some of the first permissions, at least some of the second permissions, and/or at least some of the third permissions.

The server 104 or another computing device receives a request for at least part of a first data record of the plurality of data records stored in the database 108. The first data record includes data relating to a first user (e.g., the first worker) of the plurality of users. The server 104, for example, may receive the request for the first data record from the network 106 or another network. The request may include, for example, identification data identifying a source of the request. The identification data may include, for example, an IP address of a computing device of the plurality of computing devices 102 (e.g., the first computing device 102*a*), from which the request originated, associated with a user of the plurality of users (e.g., the first worker). Additionally or alternatively, the identification data may include a username and/or a password (e.g., login information) associated with the first worker. The identification data may include any other data that may be used to identify the source of the request.

The server 104 or another computing device identifies the source of the request. The server 104 may identify the source of the request by, for example, comparing the received identification data with predetermined identification data stored at the server 104 or another storage device. The predetermined identification data stored at the server 104 may, for example, include IP addresses and usernames and passwords corresponding to data (e.g., textual data) identifying the plurality of users. In one embodiment, the predetermined identification data stored at the server 104 may also include the roles corresponding to at least some users of the plurality of users. For example, for the second worker (e.g., named Jane Smith), the identification data stored at the server 104 includes data for the IP address of the computing device assigned to the second worker, the username and password assigned to the second user to access the system 100 (e.g., the second computing device 102*b*), and data identifying the second worker (e.g., textual data for "JSMITH1"). The data identifying the name of the second worker may be the same as or different than the username assigned to the second user to access the system 100. The predetermined identification data may be stored in a table stored at the server 104, for example.

The server 104 or another computing device determines, using the permission matrix 110, a portion of the first data record accessible to the identified source of the request. A representation of the identified source (e.g., the data identifying the second worker, the IP address for the second computing device 102*b*, and/or the username assigned to the second user) may be an input to the permission matrix 110, and the portion of the first data record accessible to the second worker may be an output of the permission matrix 110. Based on the first permissions defined by the permission matrix 110, the second worker may, for example, be able to view all of the first portion of the data (e.g., generated by the second worker when the first worker starts working at the enterprise), at least part of the second portion of the data (e.g., generated by the second worker), at least part of the third portion of the data (e.g., automatically generated), and at least part of the fourth portion of the data (e.g., generated by the second worker and/or the other workers). Based on the second permissions defined by the permission matrix 110, the second worker may, for example, be able to update all of the first portion of the data, update none of the second portion of the data, update none of the third portion of the data, and update at least part of the fourth portion of the data. In one embodiment, one or more users of the plurality of users (e.g., the third worker) may be able to update all of the first portion of the data, the second portion of the data, the third portion of the data, and/or the fourth portion of the data based on the second permissions.

The server 104 or another computing device transmits the determined portion of the first data record to the identified source based on the determination. For example, the determined portion of the first data record may be transmitted to the identified source (e.g., the second worker and/or the second computing device 102*b*) via the network 106. In one embodiment, the identified source is the second worker, and the determined portion of the first data record may be transmitted to the second computing device 102*b* via the network 106. The determined portion of the first data record may be stored at the second computing device 102*b*, at least temporarily. The determined portion of the first data record may be displayed to the second worker via a graphical user interface on a display of the second computing device 102*b*. The graphical user interface may be part of a software program running on the second computing device 102*b*, for example. In one embodiment, the determined portion of the first data record may be viewed by the second worker via a web-based interface displayed at the second computing device 102*b*, for example. The determined portion of the first data record may represent a portion of the "profile" for the first worker. An example of the "profile" for the first worker, for example, is shown below in FIG. 4 with examples of the types of data that may make up the first portion of the data, the second portion of the data, the third portion of the data, and/or the fourth portion of the data.

Figure 2:
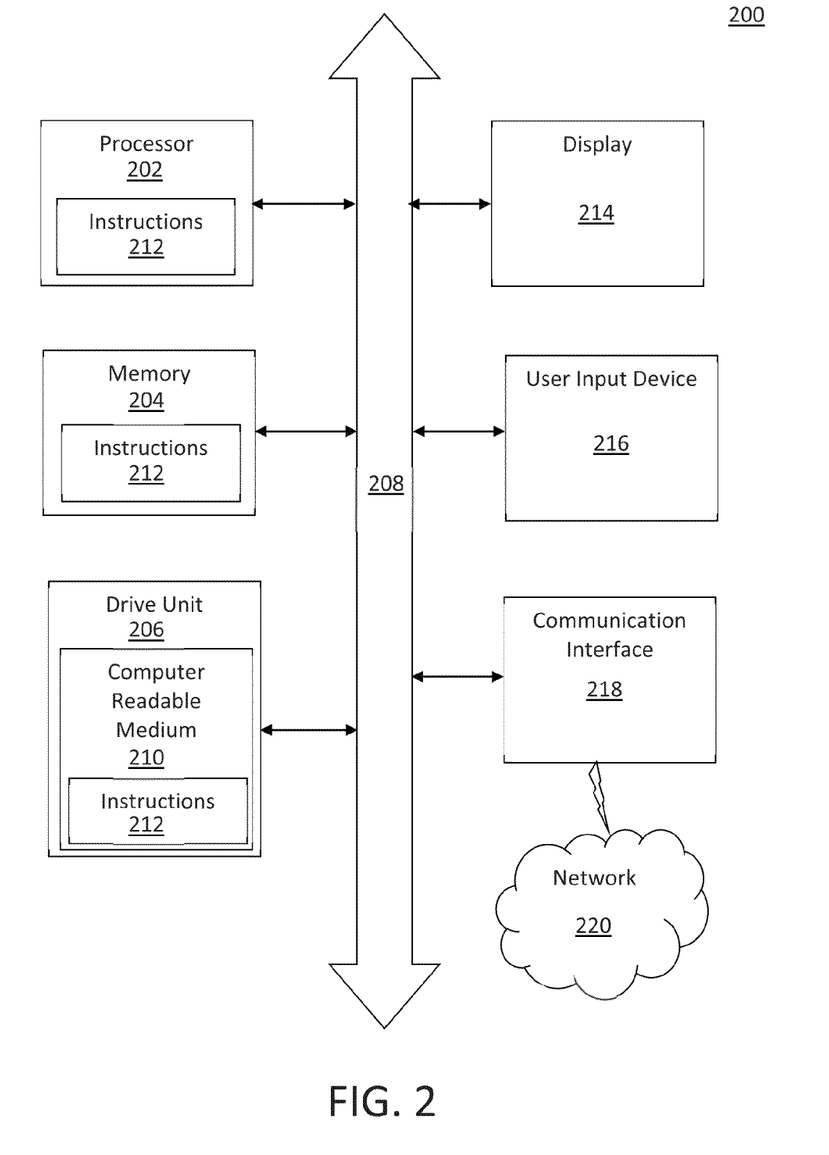
FIG. 2 shows one embodiment of a computer system for use with the system of FIG. 1.

FIG. 2 shows an illustrative embodiment of a general computer system 200. The computer system 200 may include a set of instructions that may be executed to cause the computer system 200 to perform any one or more of the methods or computer based functions disclosed herein. The computer system 200 may operate as a standalone device or may be connected (e.g., using the network 106) to other computer systems or peripheral devices. Any of the components discussed above (e.g., the first computing device 102*a*, the second computing device 102*b*, the third computing device 102*c*, and/or the server 104) may be a computer system 200 or a component in the computer system 200.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In one embodiment, the computer system 200 may be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that may communicate via a bus 208. The memory 204 may be representative of the database 108. The memory 204 may be a main memory, a static memory, or a dynamic memory. The memory 204 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in a disk or optical drive unit 206 (e.g., a disk drive unit).

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In one embodiment, as depicted in FIG. 2, the computer system 200 may also include the disk or optical drive unit 206. The disk drive unit 206 may include a computer-readable medium 210, in which one or more sets of instructions 212 (e.g., software) may be embedded. Further, the instructions 212 may embody one or more of the methods or logic as described herein. In one embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 may communicate voice, video, audio, images or any other data over the network 220. Further, the instructions 212 may be transmitted or received over the network 220 via a communication port 218. The communication port 218 may be a part of the processor 202 or may be a separate component. The communication port 218 may be created in software or may be a physical connection in hardware. The communication port 218 is configured to connect with the network 220 or another network, external media, the display 214, any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof, and may be representative of the network 106. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media (e.g., a centralized or distributed database and/or associated caches and servers that store one or more sets of instructions). The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In one embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 3:
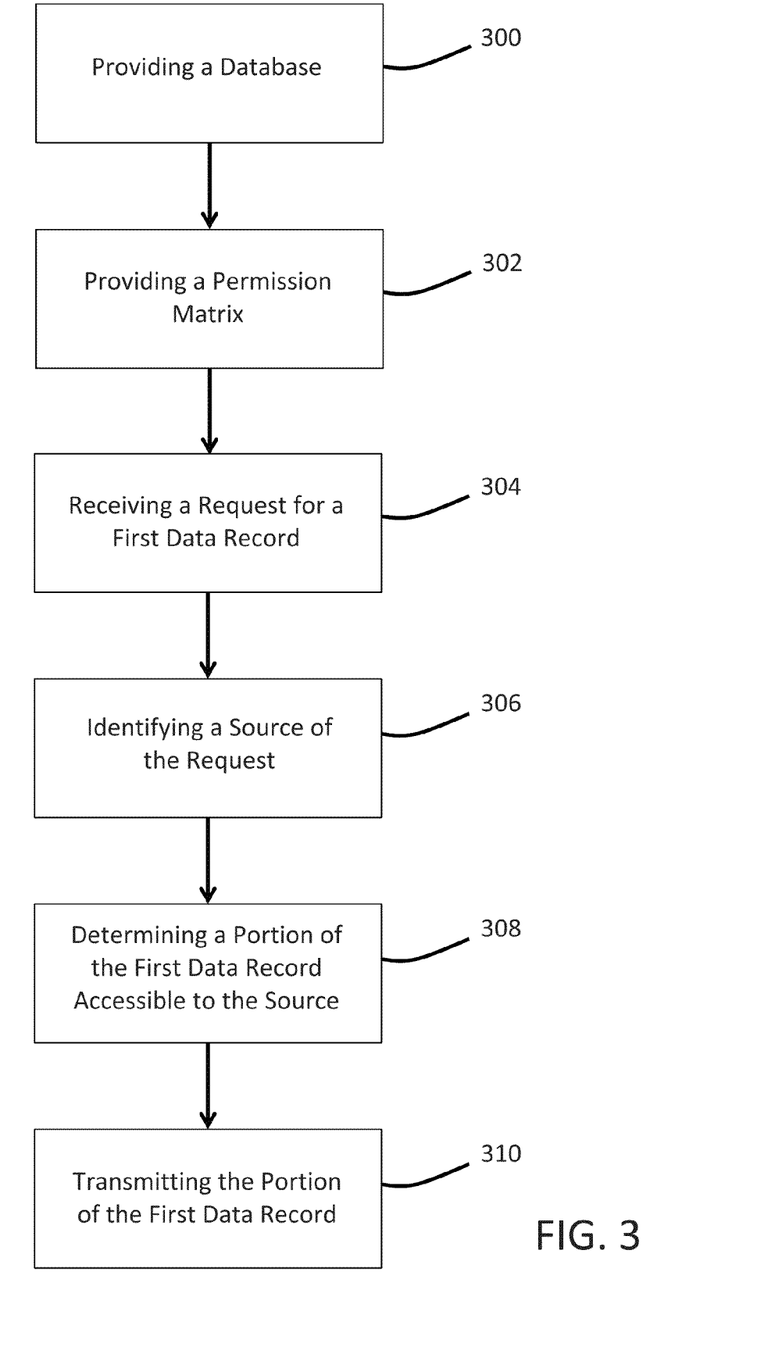
FIG. 3 shows a flowchart of one embodiment of a method for sharing data among a plurality of users of an enterprise resource management architecture.

FIG. 3 shows a flowchart of one embodiment of a method for sharing data among a plurality of users of an enterprise resource management architecture. The method may be performed using the system 100 shown in FIG. 1 or another system. The method is implemented in the order shown, but other orders may be used. Additional, different, or fewer acts may be provided. Similar methods may be used for presenting information relevant to user activity.

The method includes providing a database including a plurality of data records (act 300). Each data record of the plurality of data records includes data relating to at least one user of the plurality of users. The data for each user of the plurality of users includes a plurality of subsets. At least some subsets of the plurality of subsets are accessible to different subsets of users of the plurality of users. The data for each user may include data about and/or associated with the user and generated by the user, and data about and/or associated with the user and generated by another user of the plurality of users. Additionally, the data for each user may include data about and/or associated with the user and automatically generated. For example, a first data record for a first worker at the enterprise may include data associated with the first worker and generated by the first worker, and data associated with the first worker and generated by one or more other workers (e.g., a second worker) at the enterprise.

The database may be part of or separate from a server. The server may be in communication with a plurality of computing devices via a network. The first user and the second user may interact with a first computing device and a second computing device, respectively, of the plurality of computing devices (e.g., provide inputs at the first computing device and the second computing device, respectively). The first user and/or the second user may generate at least part of the first data record via the first computing device and the second computing device, respectively, when the first worker starts working at the enterprise. The generated first data record may be transmitted to the server, for example, and stored in the database. The first worker, the second worker, other users of the plurality of users, or a combination thereof may update the generated first data record. The update may add to the first data record, delete from the first data record, or a combination thereof. The first data record, for example, may include at least a first subset and a second subset of the plurality of subsets. The first subset and the second subset may correspond to the first worker, for example. The first subset may be about and/or associated with the first worker and may be generated by the first worker. The second subset may be about and/or associated with the first worker and may be generated by the second worker, for example. In one embodiment, the first subset may include, for example, data for projects that the first worker has worked on, is working on, and/or will work on. The second subset may include, for example, data for a performance review for the first worker or data for data for wages and/or bonuses the first worker earns.

The method also includes providing a permission matrix (act 302). The permission matrix may be stored at the server or may be separate from the server. The permission matrix may be accessible by the plurality of computing devices via the network. The permission matrix defines, for each user of the plurality of users, first permissions and second permissions. The first permissions and the second permissions of the permission matrix define which parts of the data are accessible to which users of the plurality of users. For example, the first permissions define which parts of the data are able to be viewed by which users of the plurality of users in both the push and pull directions. The second permissions define which users of the plurality of users have permission to update which parts of the data. The permission matrix may also include third permissions for at least one user of the plurality of users. The third permissions may define which parts of the data the at least one user is to receive in the push direction. The permission matrix may define first permissions, second permissions, and/or third permissions for less than all users of the plurality of users.

A user (e.g., the first worker) of the plurality of users may have control (e.g., be able to set via a computing device of the plurality of computing devices) of less than all of the first permissions and/or the second permissions. In one embodiment, at least some users of the plurality of users are identified by at least one role of a plurality of roles within the enterprise. The role may be defined by the position and/or the department, in which the user works. For example, the role may be "Design Engineer," "Manager," "Developer," "Call Center Associate," "IT Technician," "CEO," or "Human Resources." The role may also be defined by other attributes of the user. The first permissions and/or the second permissions of the permission matrix may be at least partially defined by the roles of the plurality of users. At least some of the first permissions and/or the second permissions of the permission matrix may, for example, be automatically set based on roles regardless of the first permissions and/or the second permissions set (or attempted to be set) by the first worker. For example, the first worker may want to prevent his or her boss from accessing a portion of the first data record generated by the first worker and may attempt to set the first permissions and/or the second permissions accordingly. The first worker may be prevented from setting the first permissions and/or the second permissions corresponding to his or her boss.

In one embodiment, one or more users of the plurality of users may have control over all of the first permissions, second permissions, third permissions, or a combination thereof. In other words, the one or more users may ultimately control which users of the plurality of users may see and/or update which data records of the plurality of data records. The one or more users may, for example, be in the human resources department of the enterprise, the information technology department of the enterprise, may be in management at the enterprise, or a combination thereof.

The method also includes receiving a request for a data record (e.g., the first data record) (act 304). The request may be received at the server or a different computing device via the network, for example. The request may include identification data. The identification data may include, for example, data for an IP address of a computing device of the plurality of computing devices, from which the request originated and/or data for a username for the enterprise resource management architecture associated with a user of the plurality of users. The identification data may include data for other information.

A source of the request may be identified (act 306). The server, for example, may compare the identification data included with the request to predetermined identification data stored at the server or another computing device. The predetermined identification data may include, for example, data for the IP addresses of the computing devices assigned to the plurality of users and usernames and/or passwords for the enterprise resource management architecture assigned to the plurality of users. The predetermined identification data may include other data operable to identify the plurality of users. The predetermined identification data may be generated for each user of the plurality of users and stored at the server when the user starts working at the enterprise. The predetermined identification data may be generated and stored at the server by one or more users of the plurality of users (e.g., the second worker).

A portion of the first data record accessible to the identified source may be determined (act 308). The portion of the first data record accessible to the identified source may be determined using the permission matrix. For example, at least part of the predetermined identification data and/or the identification data included with the request may be used as an input to the permission matrix, and the portion of the first data record accessible to the identified source may be determined based on the first permissions, the second permissions, and/or the third permissions of the permission matrix. The portion of the first data record may be accessible to the identified source in that the identified source may view the portion of the first data record in the pull direction, view the portion of the first data record in the push direction, update the portion of the first data record, or a combination thereof.

In one embodiment, where the identified source is the first worker, for example, the determined portion of the first data record may be all of the first subset and less than all of the second subset. In other words, the first worker is able to access (e.g., view and/or update), for example, the data for projects that the first worker has worked on, is working on, and/or will work on generated by the first worker, but is not able to access, for example, at least some of the data for the performance review for the first worker, generated by the second worker. In another embodiment, where the identified source is the second worker, for example, the determined portion of the first data record may be less than all of the first subset and all of the second subset. In other words, the second worker is able to access (e.g., view and/or update), for example, the data for projects that the first worker has worked on, is working on, and/or will work on, generated by the first worker, but is able to access, for example, all of the data for the performance review for the first worker, generated by the second worker.

The determined portion of the first data record may be transmitted to the identified source (act 310). For example, the determined portion of the first data record may be transmitted from the server to a computing device (e.g., the second computing device) identified as the source or a computing device associated with the identified source (e.g., the second worker). The determined portion of the first data record may be transmitted via the network, for example. The transmitted portion of the first data record may be displayed within a graphical user interface generated by a computer program, for example, running on the second computing device. Alternatively, the determined portion of the first data record may be displayed to the second worker within a web-based interface at the second computing device, for example. In one embodiment, the second worker, for example, may be able to view and/or update the determined portion of the first data record at the server, without the determined portion of the first data record being transmitted to the second worker.

FIGS. 4a-4d show an exemplary interface at a computing device (e.g., the second computing device) for displaying data (e.g., the determined portion of the first data record) requested by a user (e.g., the second worker) at the computing device. The data requested by the second worker, for example, may be a profile (e.g., a page) for the first worker, for example. The interface may link to other features/functionalities of the enterprise resource management architecture.

Figure 4A:
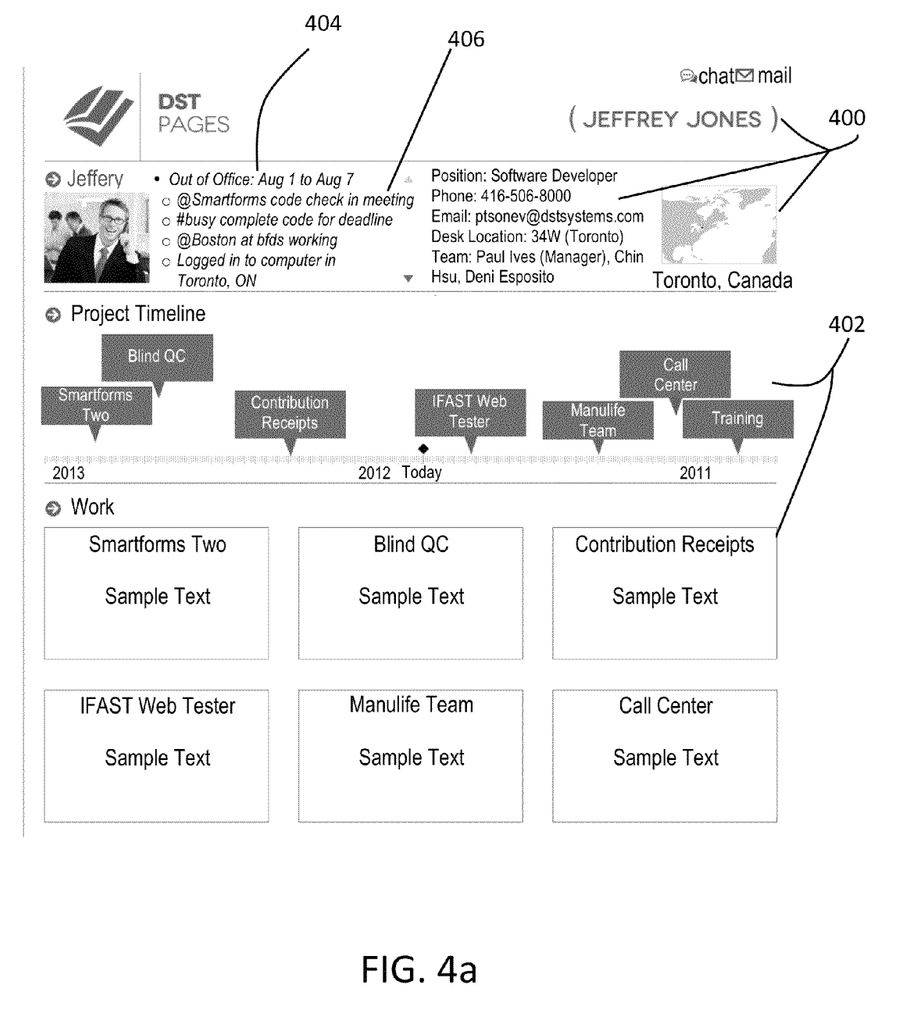
FIGS. 4a-4d show an exemplary interface at a computing device for displaying data requested by a user at the computing device.

FIG. 4a shows a first part of the first data record relating to the first worker, for example, displayed at the second computing device. The first data record includes, for example, a first portion 400 of the data relating to the first worker (e.g., Jeffrey Jones). The first portion 400 of the data may be generated by one or more users (e.g., the first worker and/or the second worker) of the plurality of workers when the first worker starts working at the enterprise. The first portion 400 of the data includes, for example, data for the worker's name (e.g., Jeffery Jones), the position, in which the worker works (e.g., Software Developer), the worker's location (e.g., Toronto), the worker's phone number and email address, the worker's location within the campus of the enterprise (e.g., 34W (Toronto)), names of team members and the manager of the worker, or a combination thereof. Other data relating to the first worker, for example, may be generated when the first worker starts at the enterprise.

The first data record also includes, for example, a second portion 402 of the data relating to the first worker. The second portion 402 of the data may be generated by the first worker while working at the enterprise. The second portion 402 of the data includes, for example, data for a project timeline and a list/description of projects that the first worker worked on in the past, is currently working on, and/or is planning on working on in the future. The project timeline may aid the staffing of projects, as the availability of the first worker is illustrated by the project timeline. The description of projects that the first worker worked on, is working on, and/or is planning for the future may aid in team building, as the description of projects may help managers identify ideal candidates based on past work experience. A search function built into the enterprise resource management architecture may be used to search the plurality of data records to identify potential team members for a team (e.g., a team builder function).

The first data record includes, for example, a third portion 404 of the data relating to the first worker. The third portion 404 of the data may be automatically generated by the server or another computing device. For example, data for current location information may be generated by the server based on a most recent IP address (e.g., "Logged into a computer in Toronto, ON"), at which the first worker most recently logged in, or a location of a tracked mobile device. Data for dates the first worker is out of office (e.g., "OUT OF OFFICE: AUG 1 to AUG 71") may be generated based on data entered into a calendar software program within or separate from the enterprise resource management architecture. Data for current location information and dates the first worker is out of the office help the efficiency of the plurality of users at the enterprise, as the second worker, for example, knows where the first worker may be working on any given day (e.g., his office in Toronto, ON) and whether the first worker is out of town.

Collaboration and communication functions may be linked to the interface. For example, chat software programs, email, and/or phone may be linked to the interface. The second worker, for example, may select the graphic for "chat" or "mail" in the top-right corner of the interface using an input device (e.g., a mouse) of the second computing device, for example, to initiate communication with another user of the plurality of users. A Twitter-like feed may also be linked to the interface. For example, a feed 406 may be displayed at the top of the interface. The feed may be displayed in other locations within the interface. Feed messages may be manually input by the first worker at the first computing device or another computing device (e.g., a mobile device) or may be automatically generated. Based on the third permissions within the permission matrix, other users (e.g., the second worker) of the plurality of users may receive the feed messages.

Figure 4B:
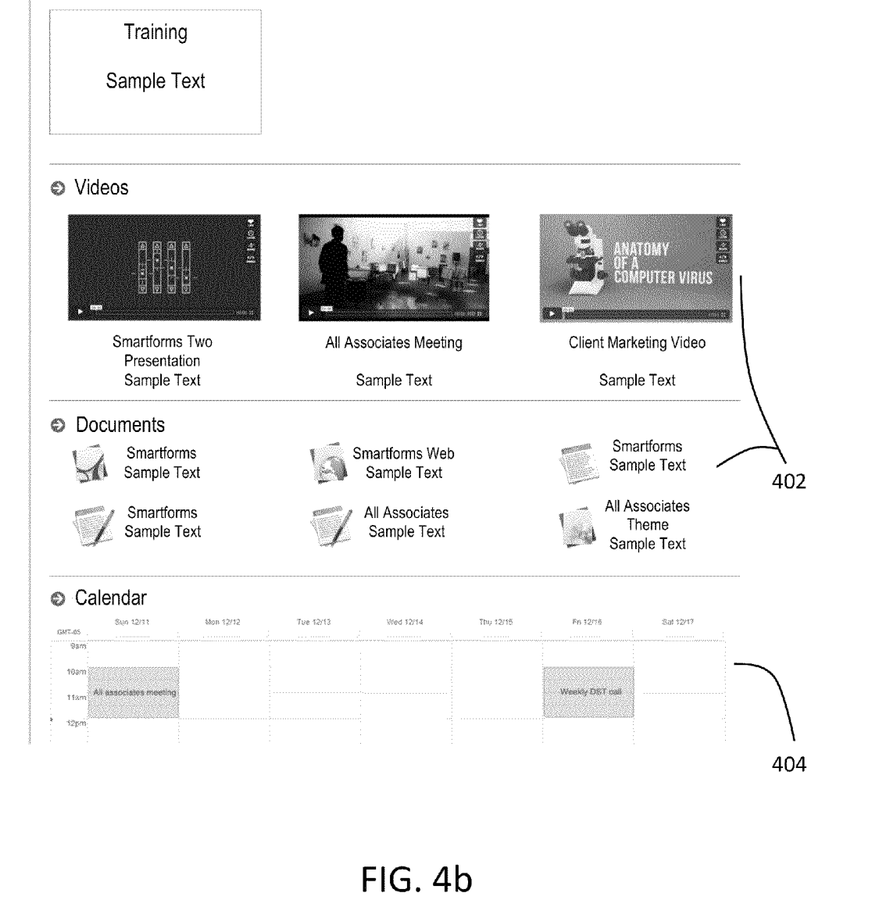

FIG. 4b shows a second part of the first data record relating to the first worker, for example, displayed at the second computing device. The second portion 402 of the data relating to the first worker may include multimedia data including videos, images, memos, presentations, drawings, or a combination thereof generated by the first worker, for example, and/or relevant to the first worker's area within the enterprise. Different types of the multimedia data may be separated within the interface. For example, as shown in FIG. 4b, "VIDEOS" and "DOCUMENTS" may be presented separately within the interface.

In one embodiment, multimedia data (e.g., videos) may be stored in personal folders associated with the plurality of users (e.g., a folder associated with the first worker) at the server, for example. All the multimedia data stored in the folder associated with the first worker, for example, may be displayed on the profile for the first worker and may be available for download by other users of the plurality of users (e.g., the second worker) based on the first permissions and/or the second permissions of the permission matrix.

The second portion 402 of the data and/or the third portion of the data 404 may include data for a company calendar for the first worker. The company calendar may identify when the first worker, for example, is in meetings and where the meetings are located. This may improve efficiency within the enterprise, as the second worker, for example, may be able to identify when the first worker is unavailable and may be able to determine where to find the first worker (e.g., which conference room). The first worker, for example, may generate the data for the company calendar and store the data within the enterprise resource management architecture. Alternatively, the data for the company calendar may be pulled from (e.g., synched with) calendar software such as, for example, MS Outlook. Functions related to the company calendar may be linked to the interface. For example, the first worker may be able to schedule meetings and events and/or reserve a conference room at the enterprise via the interface.

Figure 4C:
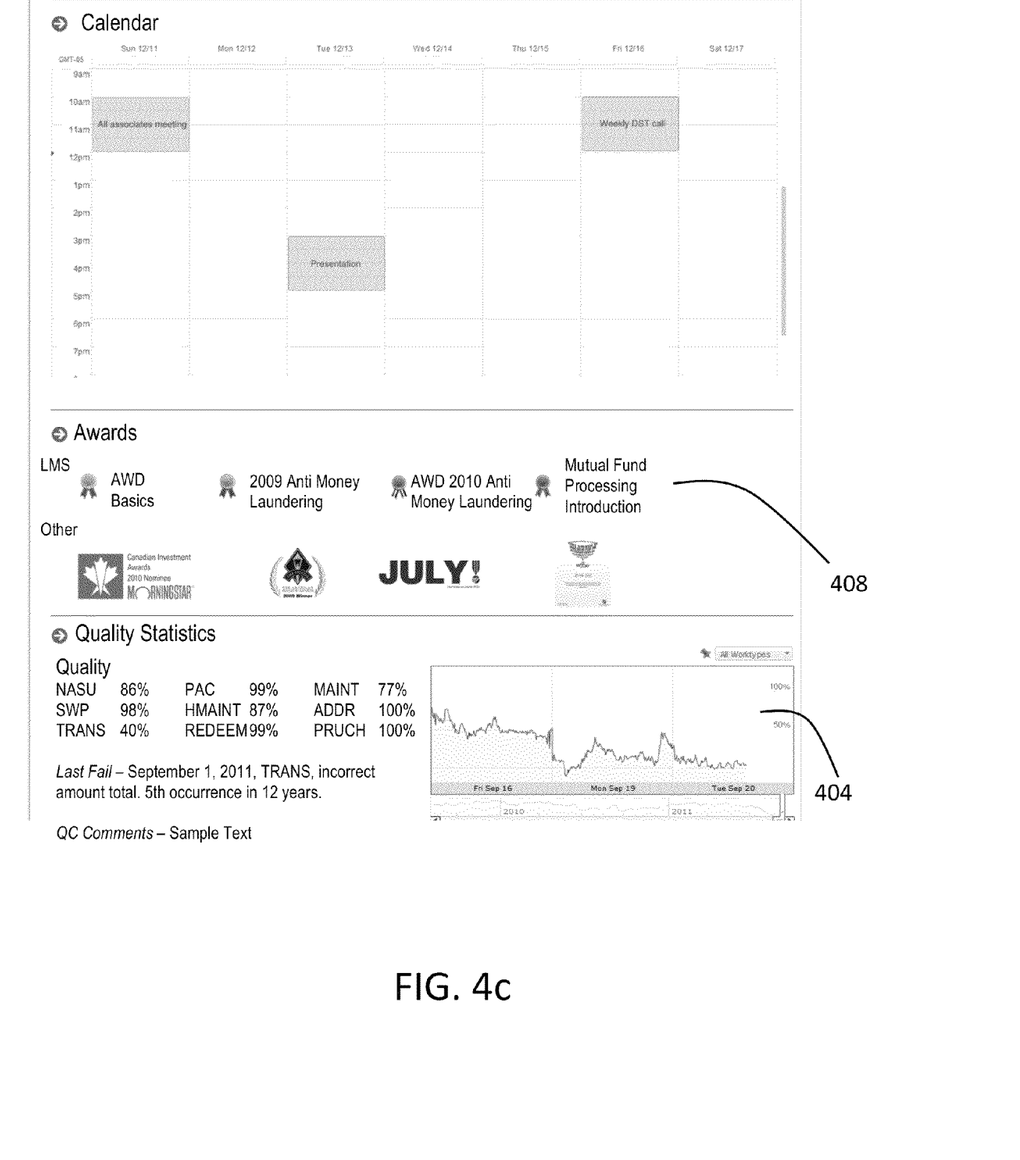

FIG. 4c shows a third part of the first data record relating to the first worker, for example, displayed at the second computing device. The first data record includes, for example, a fourth portion 408 of the data relating to the first worker. The fourth portion of the data may be associated with the first worker (e.g., directed to the first worker or about the first worker). The second worker or other users of the plurality of users may generate the fourth portion 408 of the data while the first worker, for example, works at the enterprise. The fourth portion 408 of the data includes, for example, data for graphics or text representing awards earned by the first worker. For example, the first worker's manager may generate some or all of the data for the awards. Alternatively or additionally, the second portion 402 of the data may include the data for graphics or text representing awards earned by the first worker (e.g., the data representing the awards may be generated by the first worker), and/or the third portion 404 of the data may include the data for graphics or text representing awards earned by the first worker (e.g., the data representing the awards may be generated automatically). For example, when the first worker achieves a milestone, the enterprise resource management architecture may automatically award a certificate to an "AWARDS" section within the interface. In one embodiment, a cash bonus may be sent to the associate when the first worker achieves the milestone and the certificate is automatically awarded.

The third portion 404 of the data may include performance data (e.g., for accuracy and/or productivity) for the first worker automatically generated by the server, for example. A "QUALITY STATISTICS" section within the interface, for example, may display the performance data both numerically and graphically, for example. The "QUALITY STATISTICS" section may also include comments (e.g., included in the second portion of the data, the third portion of the data, the fourth portion of the data, or a combination thereof) regarding the performance data.

Figure 4D:
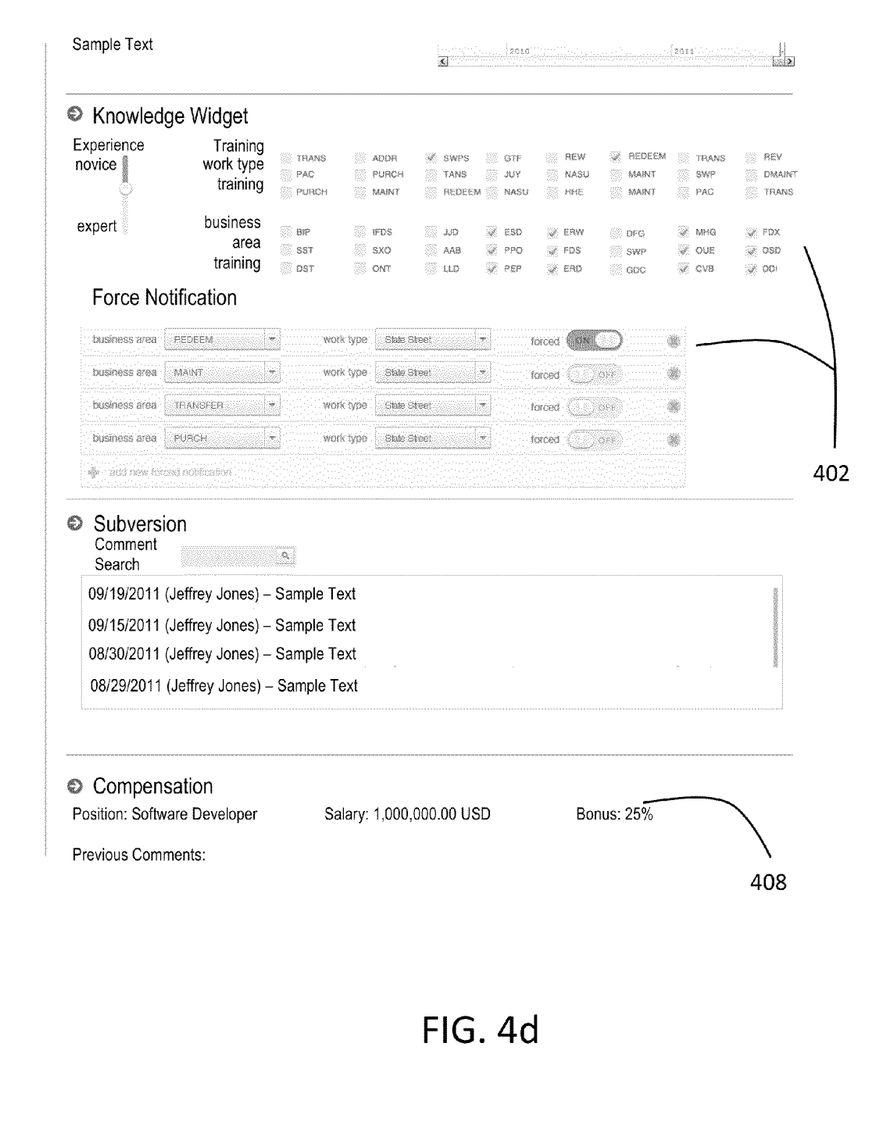

FIG. 4d shows a fourth part of the first data record relating to the first worker, for example, displayed at the second computing device. The second portion 402 of the data also includes, for example, data for user settings set by the first worker at the first computing device, for example. The data for user settings may also include data for settings for the Knowledge Widget [Incorporate Knowledge Widget application by reference]. The settings for the Knowledge Widget may allow the first user, for example, to set display preferences (e.g., forced notifications). Alternatively, the display preferences may be automatically set depending on the first worker's use. The settings for the Knowledge Widget may also allow the first user, for example, to set areas of expertise and/or levels of expertise (e.g., from "novice" to "expert").

If the first worker is a developer within the enterprise, for example, the second portion 402 of the data may include data for comments and code changes (e.g., subversion) for different revisions of software code within, for example, a "SUBVERSION" section of the interface. A search function built into the enterprise resource management architecture may be used to search the comments and code changes. The comments and code changes documented in the profile for the first worker, for example, may prevent the same mistakes from being repeated, thus increasing the efficiency of the first worker and the other users of the plurality of users.

The fourth portion 408 of the data may include, for example, human resources (HR) data. The HR data may include data for the first worker's position within the enterprise (e.g., "Software Developer"), the first worker's salary, and the first worker's bonus (e.g., 25%) within a "COMPENSATION" section of the interface. The HR data may only be accessible, as defined by the permission matrix, to users of the plurality of users that work in the HR department of the enterprise. In one embodiment, the HR data for the first worker may not be accessible to the first worker.

The first part, the second part, the third part, and the fourth part of the first data record may be displayed within the interface as a single profile that may be scrolled through using an input device of the second computing device, for example. Alternatively, the first part, the second part, the third part, and the fourth part may be displayed separately at the interface.

The first data record may include other data shown in FIGS. 4a-4d. For example, the first data record may include data for inventory in the possession of the first worker such as, for example, a presentation clicker. The presentation clicker may be available to other users of the plurality of users, and the other users may search the enterprise resource management architecture to determine the availability. The first data record may also include data representing software and keys issued to the first worker, for example. Resources within the enterprise may thus be tracked. The first data record may include data generated by the first worker or another user of the plurality of users for goals for the first worker during a work year. The first worker may sit down with the first worker's manager at year-end to set these goals and performance standards for the work year. The first data record may also include data for a key ring for one or more usernames and one or more passwords to access other systems. Each data record (e.g., the first data record) of the plurality of data records may include data for an organization chart for the enterprise. The organization chart may be populated from data of the plurality of data records, and the organization chart may be graphically displayed within the interface. A timeline of how the organization chart has changed with time may be stored at the server.

Other functions may be linked to the interface. For example, a full feature search may be integrated with the interface. The plurality of users may be able to search the plurality of records (e.g., profiles or pages) to retrieve information. For example, a search on the term "Smartforms" may produce a list with the people, projects, meetings, videos, etc. that contain the word "Smartforms." A search may be limited to name, status, code, videos, documents, calendar events, awards, projects, inventory, etc. In one embodiment, the interface may be linked to an organization content management system (e.g., Alfresco) to display articles written by the first worker. The first worker, for example, may be able to launch other applications within the interface. Using the key ring of the first data record, for example, the first worker may be automatically logged in to launch the application.

The plurality of data records stored at the server may be analyzed to identify and understand historical patterns of the plurality of users (e.g., analytic information). The analytic information may be sold to other parties. If a user of the plurality of users leaves the enterprise, the data record corresponding to the user remain at the server or another computing device. In other words, if the user leaves the enterprise, the knowledge obtained by the user while working at the enterprise stays at the enterprise. This may allow auditors easier access to logs of behavior of the plurality of users. External programs (e.g., programs running on an auditor's computing device) may be able to query the plurality of data records stored at the server.

Elements of the enterprise resource management architecture may be self-learning. For example, some elements of the enterprise resource management architecture may be configured for use based off data of the plurality of data records gathered automatically or input manually. For example, work types and/or businesses identified in projects of the project timeline of the first data record, for example, may be used to determine Knowledge Widget settings for the first worker. In one embodiment, the server may determine a travel pattern for the first worker based on the first data record and automatically prearrange printing of security badges at a remote site.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A method for sharing data among a set of users of an enterprise resource management architecture, the set of users comprising a plurality of user subsets, the method comprising:
providing a database comprising a plurality of data records, each data record of the plurality of data records comprising a data set relating to at least one user subset of the plurality user subsets, the data set comprising a plurality of data subsets, each data subset of the plurality of data subsets being accessible to at least one user subset of the plurality of user subsets;
providing a permission matrix defining, for each user of the set of users, first permissions and second permissions, the first permissions defining, for each user subset of the plurality of user subsets, a corresponding data subset of the plurality of data subsets, to which the subset of users has access to view, the second permissions defining, for each user subset of the plurality of user subsets, a corresponding data subset of the plurality of data subsets, to which the subset of users has access to update, the at least one user subset having control of less than all of the first permissions, the second permissions, or combinations thereof;
receiving, via a client, a request for a first data record of the plurality of data records, the first data record comprising a data set relating to a first user of the set of users;
identifying a source of the request;
determining, using the permission matrix, at least a portion of the first data record accessible to the identified source of the request; and
transmitting the portion of the first data record to the identified source based on the determination,
wherein the first data record comprises a first data subset and a second data subset of the plurality of data subsets, the first data subset being about the first user and being generated by the first user, the second data subset being about the first user and being generated by a second user of the set of users, and
wherein the determined portion of the first data record is all of the first data subset and less than all of the second data subset when the identified source is the first user.

2. The method of claim 1, wherein the first permissions define, for each of the subsets of users, a first part of the corresponding data subset that is provided upon request and a second part of the corresponding data subset that is automatically provided when changes are made to the second part.

3. The method of claim 2, wherein the permission matrix further defines, for at least one user of the set of users, third permissions, the third permissions defining, for the at least one user of the set of users, a corresponding data subset of the data subsets that the at least one user is to receive without requesting the corresponding data subset.

4. The method of claim 1, wherein receiving the request comprises receiving identification data representing an IP address of the client or a username associated with the source, and
wherein identifying the source of the request comprises identifying the source based on the received identification data.

5. The method of claim 1, further comprising displaying the portion of the first data record within a web-based interface at the client.

6. The method of claim 1, wherein each user of the set of users is identified by at least one role of a plurality of roles within an enterprise, and
wherein at least some of the first permissions, the second permissions, or combinations thereof, are based on at least one role of the plurality of roles.

7. The method of claim 1, wherein the determined portion of the first data record is at least some of the first data subset and all of the second data subset when the identified source is the second user.

8. The method of claim 1, wherein the set of users is first users, and
wherein at least one second user has control of all of the first permissions and the second permissions for at least one of the first users.

9. In a non-transitory computer readable storage medium having stored therein data representing instructions executable by a programmed processor for sharing data among a set of user of an enterprise resource management architecture, the set of users comprising a plurality of subsets, the instructions comprising:
storing a plurality of data records, each data record of the plurality of data records comprising a data set relating to one user of the set of users, the data set comprising a plurality of data subsets, each of the data subsets being accessible to at least one of the subsets;
storing a permission matrix defining, for each user of the set of users, first permissions and second permissions, the first permissions defining, for each of the subsets of users, a corresponding data subset of the data subsets, to which the subset of users has access to view, the second permissions defining, for each of the subsets of users, a corresponding data subsets of the data subsets, to which the subset of users has access to update, the user having control of less than all of the first permissions, the second permissions, or combinations thereof;
receiving a request for a first data record of the plurality of data records, the first data record comprising a data set relating to a first user of the set of users;
identifying a source of the request;
determining, using the permission matrix, at least a portion of the first data record accessible to the identified source of the request; and
transmitting the portion of the first data record to the identified source based on the determination,
wherein the first data record comprises a first subset and a second subset of the plurality of subsets, the first subset being about the first user and being generated by the first user, the second subset being about the first user and being generated by a second user of the plurality of users, and
wherein the determined portion of the first data record is all of the first subset and less than all of the second subset when the identified source is the first user.

10. The non-transitory computer readable storage medium of claim 9, wherein the permission matrix further defines, for at least one user of the set of users, third permissions, the third permissions defining, for the at least one user of the set of users, a corresponding data subset of the data subsets that the at least one user is to receive without requesting the corresponding data subset.

11. The non-transitory computer readable storage medium of claim 9, wherein each user of the set of users is identified by at least one role of a plurality of roles within an enterprise, and wherein at least some of the first permissions, the second permissions, or combinations thereof, are based on at least one role of the plurality of roles.

12. The non-transitory computer readable storage medium of claim 9, wherein the determined portion of the first data record is at least some of the first subset and all of the second subset when the identified source is the second user.

13. The non-transitory computer readable storage medium of claim 9, wherein the set of users are first users, and
wherein at least one second user has control of all of the first permissions and the second permissions for at least one of the first users.

14. A system for sharing data among a set of users of an enterprise resource management architecture, the set of users comprising a plurality of subsets, the system comprising:
a database comprising a plurality of data records, each data record of the plurality of data records comprising a data set relating to one user of the set of users, the data set comprising a plurality of data subsets, each of the data subsets being accessible to at least one of the subsets of users;
a permission matrix operable to define, for each user of the set of users, first permissions and second permissions, the first permissions defining, for each of the subsets of users, a corresponding data subset of the data subsets, to which the subset of users has access to view, the second permissions defining, for each of the subsets of users, a corresponding data subset of the data subsets, to which the subset of users has access to update, the user having control of less than all of the first permissions, the second permission, or combinations thereof; and
an input operable to receive a request for a first data record of the plurality of data records, the first data record comprising a data set relating to a first user of the set of users; and
a processor operable to:
identify a source of the request;
determine, using the permission matrix, at least a portion of the first data record accessible to the identified source of the request; and
transmit the portion of the first data record to the identified source based on the determination,
wherein the first data record comprises a first subset and a second subset of the plurality of subsets, the first subset being about the first user and being generated by the first user, the second subset being about the first user and being generated by a second user of the plurality of users, and
wherein the determined portion of the first data record is all of the first subset and less than all of the second subset when the identified source is the first user.

15. The system of claim 14, wherein each user of the set of users is identified by at least one role of a plurality of roles within an enterprise, and
wherein at least some of the first permissions, the second permissions, or combinations thereof, are based on at least one role of the plurality of roles.

16. The system of claim 14, wherein the determined portion of the first data record is at least some of the first subset and all of the second subset when the identified source is the second user.

17. The system of claim 14, wherein the set of users is first users, and
wherein at least one second user has control of all of the first permissions and the second permissions for at least one of the first users.

* * * * *